United States Patent
Brobst

(10) Patent No.: US 9,886,492 B2
(45) Date of Patent: Feb. 6, 2018

(54) SELF-ADJUSTING DATABASE-QUERY OPTIMIZER

(75) Inventor: Stephen Brobst, Henderson, NV (US)

(73) Assignee: Teradata US, Inc., Dayton, OH (US)

(*) Notice: Subject to any disclaimer, the term of this patent is extended or adjusted under 35 U.S.C. 154(b) by 3582 days.

(21) Appl. No.: 11/281,527

(22) Filed: Nov. 17, 2005

(65) Prior Publication Data
US 2006/0136396 A1    Jun. 22, 2006

Related U.S. Application Data

(63) Continuation of application No. 11/219,250, filed on Sep. 2, 2005, now abandoned, which is a continuation of application No. 11/022,376, filed on Dec. 22, 2004, now abandoned.

(51) Int. Cl.
*G06F 17/30* (2006.01)

(52) U.S. Cl.
CPC .. *G06F 17/30595* (2013.01); *G06F 17/30463* (2013.01); *G06F 17/30474* (2013.01)

(58) Field of Classification Search
CPC ......... G06F 17/30864; G06F 17/30867; G06F 17/30067; G06F 17/30595; G06F 17/30463; G06F 17/30474
USPC ... 707/1, 2, 3, 4, 5, 6, 7, 100, 102, 103, 705
See application file for complete search history.

(56) References Cited

U.S. PATENT DOCUMENTS

| | | | |
|---|---|---|---|
| 5,822,747 A * | 10/1998 | Graefe et al. | 707/2 |
| 6,353,818 B1 * | 3/2002 | Carino, Jr. | G06F 17/30463 |
| 6,633,883 B2 * | 10/2003 | Koskas | 707/101 |
| 7,383,246 B2 * | 6/2008 | Lohman | G06F 17/30979 |
| 8,046,354 B2 * | 10/2011 | Day | G06F 17/30463 706/14 |
| 8,775,412 B2 * | 7/2014 | Day | G06F 17/30474 707/718 |
| 2002/0198867 A1 * | 12/2002 | Lohman | G06F 17/30469 |
| 2003/0018618 A1 * | 1/2003 | Bestgen et al. | 707/3 |
| 2003/0061244 A1 * | 3/2003 | Hirohata | 707/200 |
| 2003/0229639 A1 * | 12/2003 | Carlson | G06F 17/30474 |
| 2004/0243799 A1 * | 12/2004 | Hacigumus et al. | 713/150 |
| 2005/0091196 A1 * | 4/2005 | Day | G06F 17/30463 |
| 2005/0097078 A1 * | 5/2005 | Lohman | G06F 17/30979 |
| 2005/0154740 A1 * | 7/2005 | Day | G06F 17/30474 |
| 2005/0289098 A1 * | 12/2005 | Barsness | G06F 17/30445 |
| 2006/0020579 A1 * | 1/2006 | Freedman et al. | 707/3 |
| 2006/0026116 A1 * | 2/2006 | Day et al. | 707/1 |
| 2006/0074874 A1 * | 4/2006 | Day | G06F 17/30463 |
| 2006/0136396 A1 * | 6/2006 | Brobst | G06F 17/30463 |

(Continued)

OTHER PUBLICATIONS

Kabra et al., "Efficient Mid-Query Re-optimization of Sub-optimal Query Execution Plans", ACM SIGMOD Record, 1998.*

(Continued)

*Primary Examiner* — Phuong Thao Cao
(74) *Attorney, Agent, or Firm* — John D. Cowart; Steven McDonald; James Stover

(57) ABSTRACT

A database-management system (DBMS) initiates execution of an incoming database query according to an initial query-execution plan that identifies an expected path for execution. Then, at some point after execution of the query has begun, the DBMS concludes that execution has not proceeded along the expected path and, in response, chooses an alternative query-execution plan for continued execution of the query.

14 Claims, 6 Drawing Sheets

(56) References Cited

U.S. PATENT DOCUMENTS

| | | | |
|---|---|---|---|
| 2007/0050328 A1* | 3/2007 | Li | G06F 17/30967 |
| 2007/0192296 A1* | 8/2007 | Burger | G06F 17/30474 |
| 2007/0282794 A1* | 12/2007 | Barsness | G06F 17/30445 |
| 2008/0133454 A1* | 6/2008 | Markl | G06F 17/30457 |
| 2008/0177722 A1* | 7/2008 | Lohman | G06F 17/30979 |

OTHER PUBLICATIONS

Markl et al., "LEO: An autonomic query optimizer for DB2", IBM Systems Journal, vol. 42, No. 1, 2003.*

Kabra et al., "Efficient Mid-Query Re-Optimization of Sub-Optimal Query Execution Plans", in Proceedings of the 1998 ACM SIGMOD International Conference on Management of Data, pp. 106-117, 1998.*

Ng et al., "Dynamic Query Re-Optimization", in Proceedings of the Eleventh International Conference on Scientific and Statistical Database Management, 10 pages, 1999.*

\* cited by examiner

SELF-ADJUSTING DATABASE-QUERY OPTIMIZER

CROSS-REFERENCE TO RELATED APPLICATIONS

This application is a continuation of U.S. application Ser. No. 11/219,250, filed on Sep. 2, 2005, now abandoned by Stephen A. Brobst and titled "Self-Adjusting Database-Query Optimizer," which is a continuation of U.S. application Ser. No. 11/022,376, filed on Dec. 22, 2004, now abandoned and also titled "Self-Adjusting Database-Query Optimizer."

BACKGROUND

Many large database systems use query-planning tools, known as optimizers, to plan effective use of database resources (e.g., CPU capacity, I/O systems, network connections, and storage facilities) and improve efficiency in query execution. The data from which query-answer sets are formed may be spread among many computer systems or processes, and the database system must organize the operation of these resources in retrieving the data. In general, the larger the database or the more complex the query, the greater is the need for a sophisticated query optimizer. Poor query optimization leads to poor system performance and, in many cases, complete failure to return an answer set altogether.

The query-optimizing tools used today rely on statistics collected against the underlying database in order to estimate the lowest cost plan for query execution. There are two major categories of database optimizers: (1) rule-based and (2) cost-based optimizers. A rule-based optimizer uses a set of well-defined rules in determining the execution path of a query, based on the statistics available for query-planning. A cost-based optimizer assesses the expected cost of query execution—in terms of the amount of each resource that must be devoted to the query-execution task—across a variety of potential execution plans. The cost-based optimizer then selects the plan that appears to be the lowest cost plan available.

In preparing a query-execution plan, a cost-based optimizer typically constructs some form of "decision tree" to enumerate the various possibilities for query execution. The optimizer then "optimizes" the execution plan by assessing how the database system would be expected to perform along each decision path in the tree and choosing the paths with the lowest expected costs. Because statistics do not always reflect reality, however, relying on statistics often leads to decision-making errors that produce ill-optimized and inefficient query-execution plans. Although rule-based optimizers are more simplistic than cost-based optimizers, inaccurate statistics can also lead to poorly optimized, and thus inefficient, query-execution plans because of incorrect inputs to the rule-based system for query optimization.

SUMMARY

Described and claimed here is a technique for use in executing a query in a database system. A database-management system (DBMS) initiates execution of the query according to an initial query-execution plan that identifies an expected path for execution. Then, at some point after execution of the query has begun, the DBMS concludes that execution has not proceeded along the expected path and, in response, chooses an alternative query-execution plan for continued execution of the query.

In some embodiments, the DBMS, in concluding that execution of the query has not proceeded along the expected path, concludes that an actual result obtained at an intermediate checkpoint in the initial query-execution plan does not match an expected result. For example, the DBMS might conclude that the actual result differs from the expected result by more than an amount equal to a predefined margin-of-error, or that the actual result differs from the expected result by more than an amount equal to one of at least two predefined margins-of-error. In the latter case, the DBMS, in choosing an alternative query-execution plan, chooses one of at least two alternative query-execution plans, where each of the alternative query-execution plans corresponds to one of the predefined margins-of-error.

In some situations, the DBMS, in choosing an alternative query-execution plan, chooses a plan that differs from the initial query-execution plan only from a point that occurs after the intermediate checkpoint in the initial query-execution plan. In other situations, the DBMS chooses a plan that differs from the initial query-execution plan from a point that occurs before the intermediate checkpoint in the initial query-execution plan. Some situations call for abandoning the initial query-execution plan altogether and choosing a plan that begins execution of the query anew.

In certain embodiments, the DBMS, in concluding that an actual result does not match an expected result, concludes that an actual row count for a database table does not match an expected row count. In other embodiments, the DBMS, in concluding that execution of the query has not proceeded along the expected path, concludes that database-demographics information gathered during execution of the query does not match expected database-demographics information.

In some embodiments, the DBMS concludes that an actual result obtained at a second intermediate checkpoint does not match an expected result for the second intermediate checkpoint and then chooses another alternative query-execution plan for continued execution of the query.

Other features and advantages will become apparent from the description and claims that follow.

DETAILED DESCRIPTION

Described below is a technique for use in executing a query in a database-management system (DBMS) with a cost-based optimizer. The technique involves the adjustment, or re-optimization, of a query-execution plan "on the fly" when the DBMS discovers that the path along which query execution is progressing does not match the path predicted by the DBMS. The amount and types of database resources that the DBMS expects to consume in executing a database query is typically related to the number and width of rows that must be accessed in database tables in order to satisfy the conditions of the query. Initially, the DBMS sources those rows from base tables in the database system. As query execution proceeds along the intended query-execution plan, the DBMS formulates and begins to work with one or more intermediate-result sets that are typically constructed by filtering and joining rows from the base tables.

The DBMS, when formulating the query-execution plan, uses database statistics to estimate the number of rows that will be produced in creating each of these intermediate-result sets. At some intermediate point during execution of the original query-execution plan, the DBMS gains visibility to the actual number of rows produced in creating an intermediate-result set. This number may or may not be similar to the number previously estimated using statistical techniques. At this intermediate point in the query-execution plan, the DBMS is able to assess whether the actual cost, in terms of database-resource usage, associated with processing the actual number of rows in the intermediate result set is sufficiently close to the estimated cost (e.g., whether the actual cost lies within some predetermined margin of error around the expected cost). If so, the DBMS typically proceeds with the query-execution plan as originally laid out. If, on the other hand, the actual number of rows returned is not sufficiently close to the estimated number, the DBMS is able to select an alternative plan for execution of the query.

Figure 1:
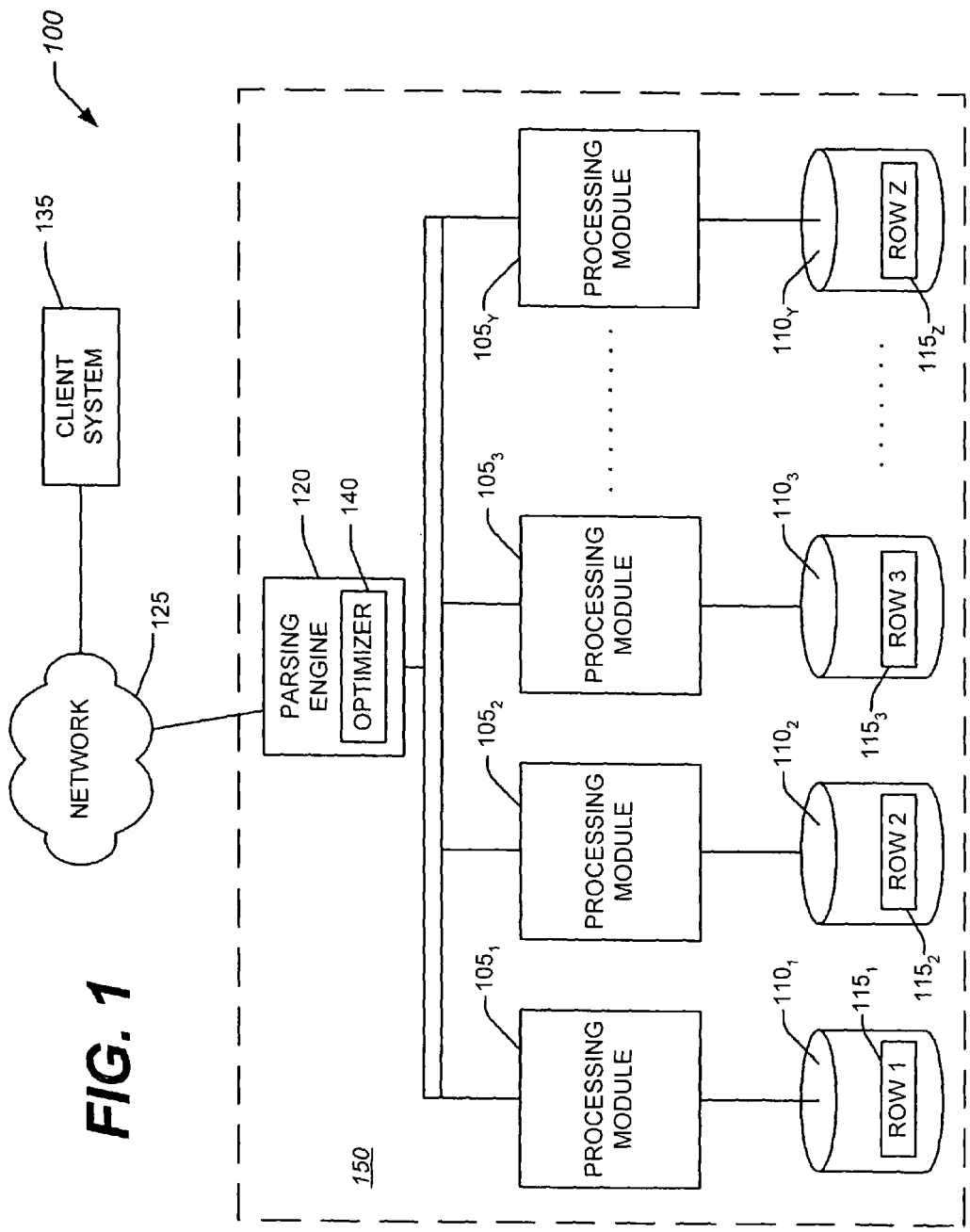
FIG. 1 is schematic diagram of a database system, such as one including a relational database management system (RDBMS) built on a massively parallel processing (MPP) platform.

FIG. 1 shows one example of a detailed architecture for a large database system 100, such as a Teradata Active Data Warehousing System from NCR Corporation, that is suited for use in implementing such a re-optimization technique. The database system 100 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the database system 100 includes one or more processing modules $105_{1 \ldots Y}$ that manage the storage and retrieval of data in data-storage facilities $110_{1 \ldots Y}$. Each of the processing modules $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing modules $105_{1 \ldots Y}$. A parsing engine 120 organizes the storage of data and the distribution of table rows $115_{1 \ldots Z}$ among the processing modules $105_{1 \ldots Y}$. The parsing engine 120 also coordinates the retrieval of data from the data-storage facilities $110_{1 \ldots Y}$ in response to queries received from a user, such as one using a client computer system 135 connected to the database system 100 through a network connection 125.

As described below, the parsing engine 120, on receiving an incoming database query, applies an optimizer component 140 to the query to assess the best plan for execution of the query. The optimizer component 140 here is a self-adjusting optimizer (described below) that is able to adjust query execution "on the fly" as the query-execution plan is carried out. Selecting the optimal query-execution plan includes, among other things, identifying which of the processing modules $105_{1 \ldots Y}$ must take place in executing the query and which database tables are involved in the query, as well as choosing which data-manipulation techniques will serve best in satisfying the conditions of the query. Database statistics are used, as described below, in making these assessments during construction of the query-execution plan. The database system typically receives queries in a standard format, such as the Structured Query Language (SQL) put forth by the American National Standards Institute (ANSI).

Figure 2:
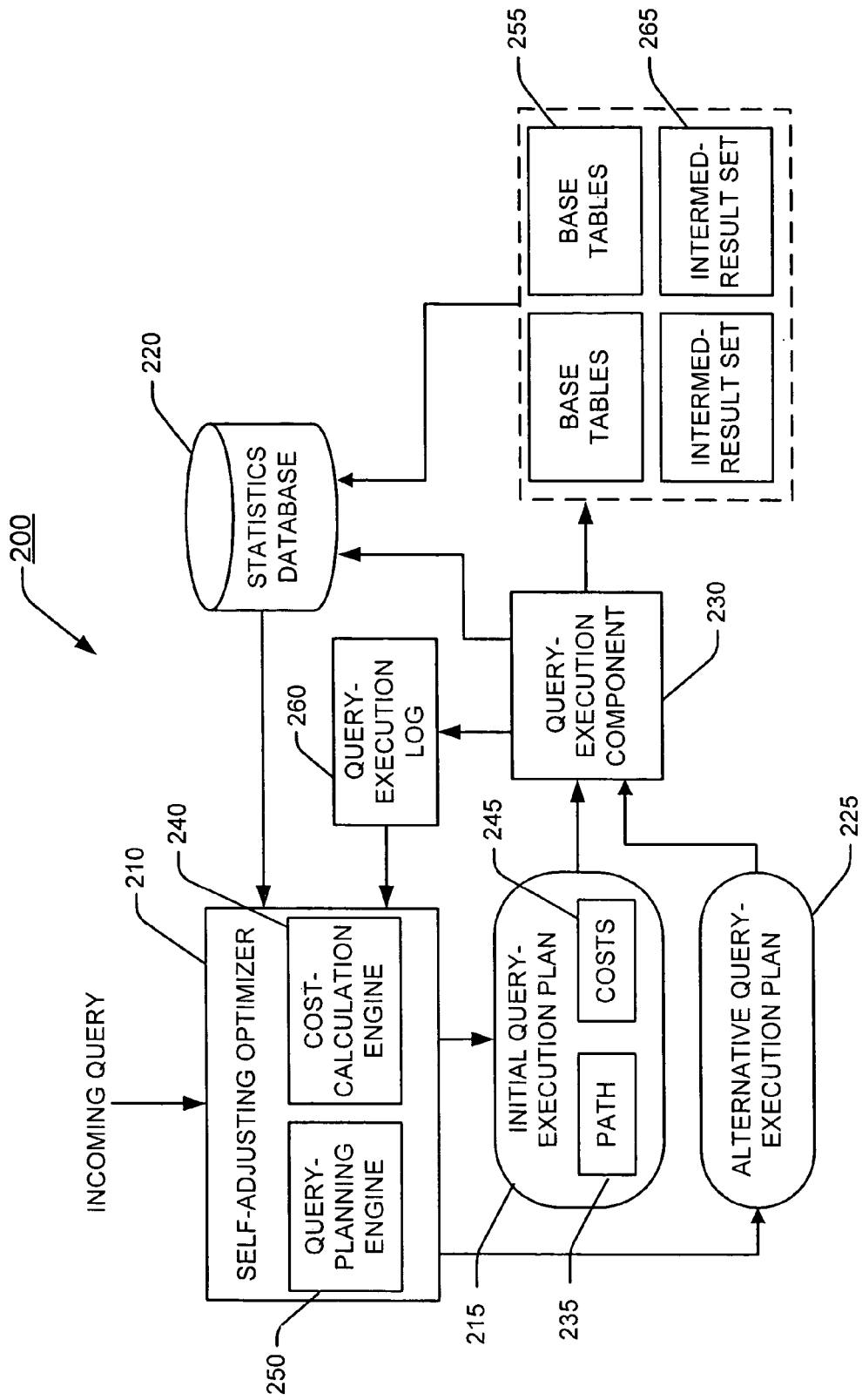
FIG. 2 is a functional block diagram of various components of a database-management system (DBMS) that are used in formulating query-execution plans.

FIG. 2 shows the components of a database management system (DBMS) 200 that allow for adjustment of a query-execution plan "on the fly" as the query-execution plan is carried out by the DBMS 200. The centerpiece component is a self-adjusting optimizer 210 that receives an incoming database query and creates a plan for executing the query. The self-adjusting optimizer 210 includes two key components: (a) a cost-calculation engine 240 that estimates the costs, in terms of database-resource usage, associated with the execution of a query along a particular query-execution path; and (b) a query-planning engine 250 that uses the cost estimates provided by the cost-calculation engine 240 in selecting what it believes will be an optimal path for query execution. The self-adjusting optimizer 210, through the query-planning engine 250, provides as output at least one query-execution plan, known as an initial query-execution plan 215.

The initial query-execution plan 215 typically calls for execution of the query along an intended execution path 235 and includes an estimated-cost analysis 245 that provides the estimated costs, in terms of database-resource usage, associated with query execution along the intended execution path 235. The intended execution path 235 includes, among other things, at least one intermediate checkpoint at which the DBMS 200 is to assess the actual costs associated with execution of the query, as described below. The estimated-cost analysis 245 indicates the costs that the self-adjusting optimizer 210 expects the DBMS 200 to incur in reaching this intermediate checkpoint along the intended execution path 235.

A query-execution component 230, which typically resides, at least in part, in the parsing engine 120 of FIG. 1, receives the initial query-execution plan 215 and executes it against one or more relational tables, or "base tables" 255, stored in the database. As the query-execution component 230 executes the initial query-execution plan 215, it builds one or more intermediate-result sets 265, which it typically stores in the database system as one or more SPOOL files or as relational tables in the database itself. The query-execution component 230 typically builds the intermediate-result sets 265 by filtering and joining the rows it accesses in the base tables 255 as it carries out the initial query-execution plan 215.

As the query-execution component 230 executes the query, it fills a query-execution log 260 with vital information about the query-execution process. This information typically describes, among other things, the row counts associated with each of the intermediate-result sets 265 created by the query-execution component 230. This row-count information is used by the self-adjusting optimizer 210, as described below, in assessing the effectiveness of the initial query-execution plan 215.

The DBMS 200 also includes a statistics database 220 that stores statistical information indicating historical usage patterns of database resources by the DBMS 200. This statistical information also typically includes data describing the result sets created over time in reply to database queries and indicating how the data that forms those result sets tends to be stored within the database. Statistics databases are well known in the art of database-management systems and are not described in detail here.

Within the self-adjusting optimizer 210, the cost-calculation engine 240 uses the statistics and data-demographics information stored in the statistics database 220 to calculate the costs associated with the execution of database queries, typically in terms of the amounts and types of database resources needed to perform specific query-execution tasks in the DBMS 200. The types of costs calculated often include the number of CPU cycles and I/O cycles and the amount of storage space required to perform various tasks. The costs calculated also often include items such as the number of processing nodes to be accessed in executing a query and the number of rows to be returned from tables within the database in generating a result set for a query. Cost calculation itself is well known in the art of database-management systems and is not described in more detail here.

The cost-calculation engine 240 derives not only the expected costs for execution of a database query, but also the actual costs incurred during execution of the query. The cost-calculation engine 240 accesses the query-execution log 260 to retrieve information indicating how execution of the query is proceeding with the initial query-execution plan 215. As described below, when the query-execution component 230 reaches a specified intermediate checkpoint in the initial query-execution plan 215, the cost-calculation engine 240 reads from the query-execution log 260 the number of rows returned in creating a corresponding one of the intermediate-result sets 265. The cost-calculation engine 240 uses this information to calculate the actual costs associated with execution of the query to that point. The self-adjusting optimizer program 210 then assesses whether query execution should continue through the initial query-execution plan 215, or whether execution according to an alternative query-execution plan 225 is in order.

In some systems, the self-adjusting optimizer program 210 creates the alternative query-execution plan 225 concurrently with the initial query-execution plan 215. In these systems, the self-adjusting optimizer program 210 also associates one or more "trigger thresholds" associated with the initial query-execution plan 215 and stores the trigger thresholds for access later. Each of these trigger thresholds specifies an acceptable margin-of-error around the expected costs associated with the initial query-execution plan 215. As described in more detail below, if the actual costs of query execution exceed the expected costs by more than this margin-of-error, the self-adjusting optimizer program 210 instructs the query-execution component 230 to proceed with execution of the query along the alternative query-execution plan 225.

In other systems, the self-adjusting optimizer program 210 creates the alternative query-execution plan 225 only upon concluding that the actual costs lie outside the margin-of-error. In these systems, the self-adjusting optimizer program 210 delivers the alternative query-execution plan 225 to the query-execution component 230 along with the instruction to switch to the alternative query-execution plan 225.

Figure 3:
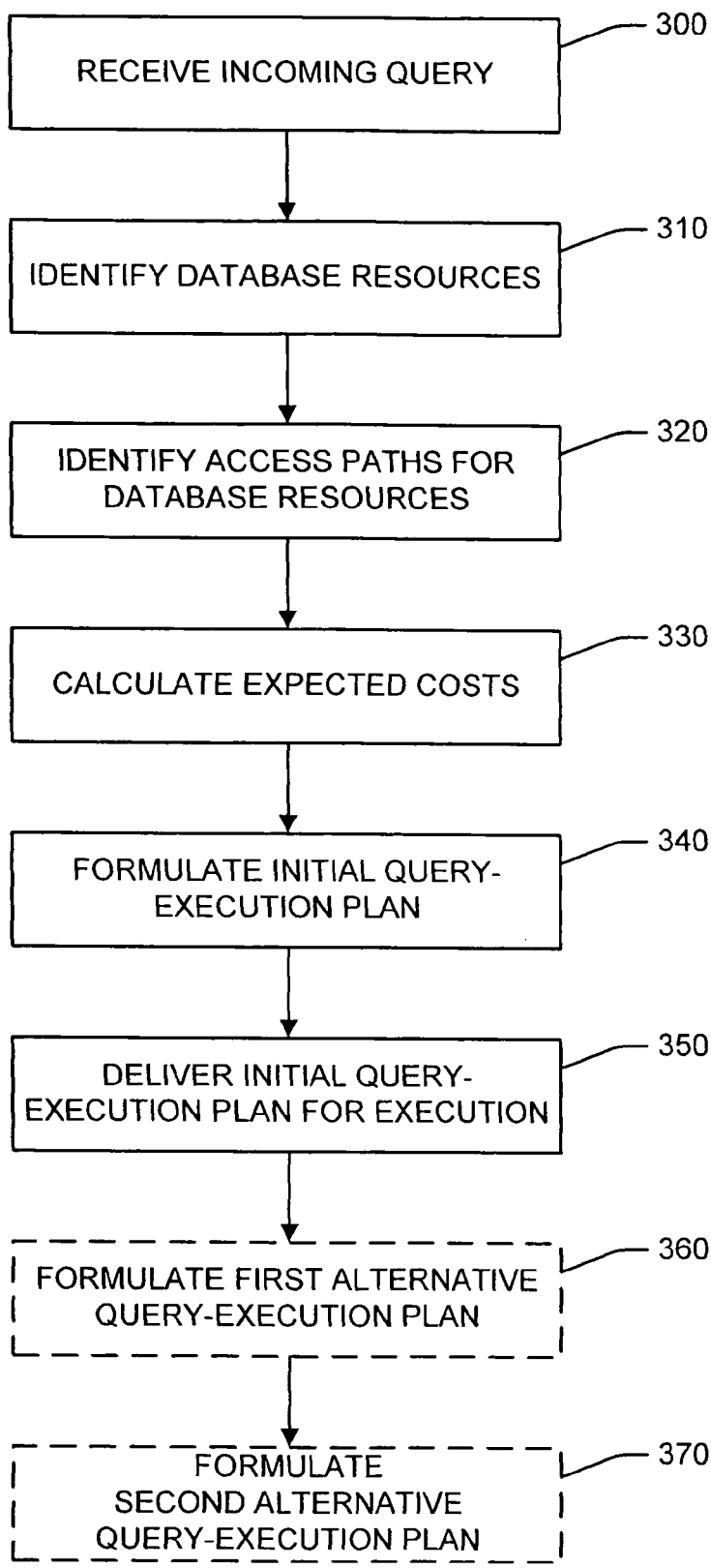
FIGS. 3, 4 and 5 are flow charts showing how a self-adjusting optimizer generates and refines a query-execution plan.
Figure 4:
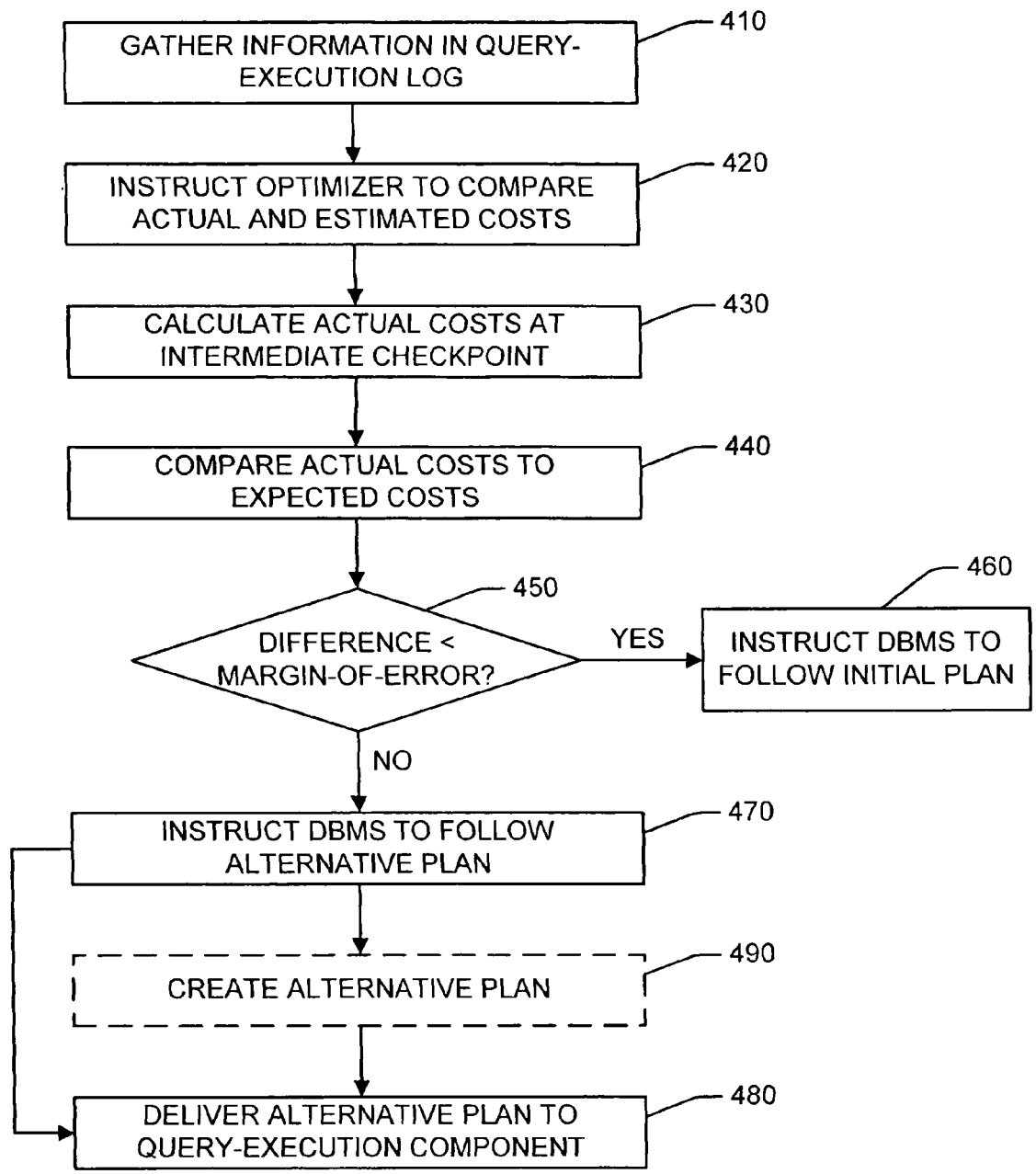
Figure 5:
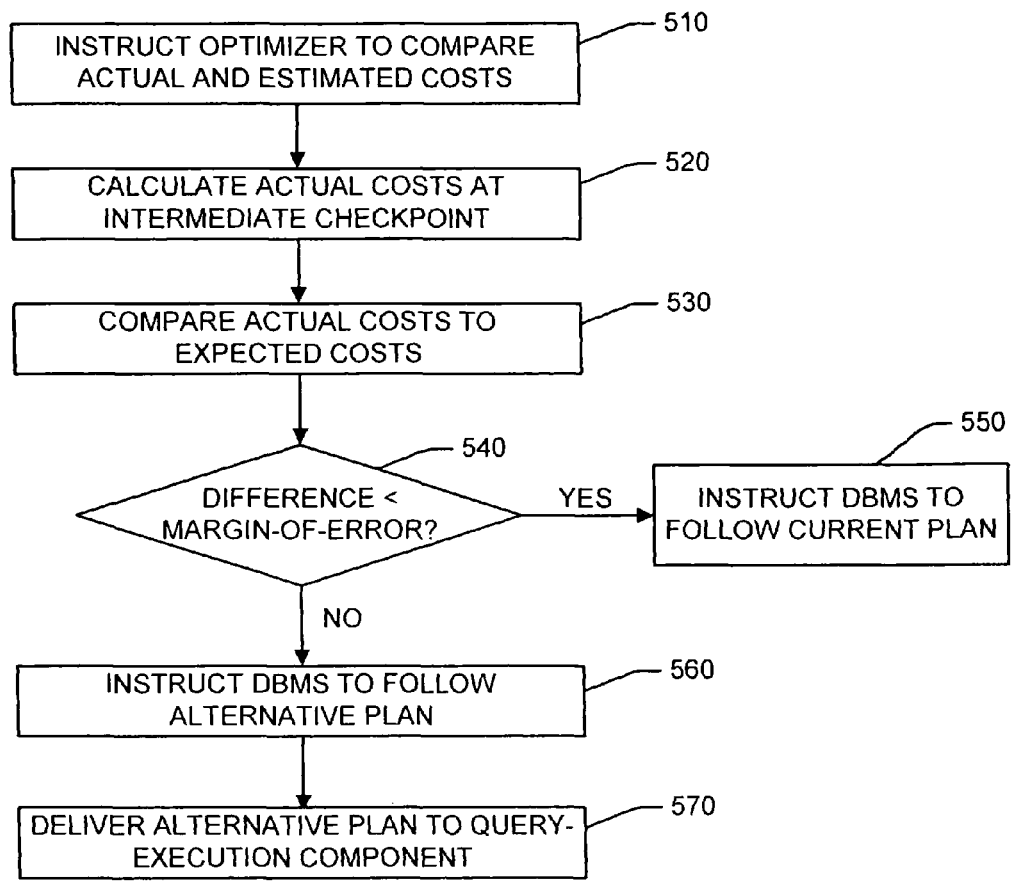

FIGS. 3, 4 and 5 show how the self-adjusting optimizer generates and refines query-execution plans for the database-management system. The self-adjusting optimizer receives an incoming query (step 300) and, drawing data from the statistics database, identifies the database resources that are most likely to be involved in executing the query (step 310). Among the types of database resources that are typically required to process a query in a relational database-management system are the various relational tables of the database and the rows and keys (e.g., primary keys (PK) and foreign keys (FK)) contained in those tables.

Once it has identified the relevant database resources, the self-adjusting optimizer draws once again on the data stored in the statistics database to identify access paths for those database resources (step 320), including, for example, any join paths that might apply to tables involved in the query. The self-adjusting optimizer then calculates the expected costs associated with each of the access paths (step 330) and, using these costs, formulates an initial query-execution plan that provides a cost-optimized way to return a result set for the query (step 340). The self-adjusting optimizer embeds in the initial query-execution plan both the intended query-execution path described above and the expected costs associated with that path. The self-adjusting optimizer also associates one or more trigger thresholds (discussed above) with the initial query-execution plan and stores these trigger thresholds for access later. The optimizer program delivers the initial query-execution plan to the DBMS for execution (step 350).

In some systems, the self-adjusting optimizer also formulates one or more alternative query-execution plans (steps 360 and 370), each based on an assumption that the actual costs associated with carrying out the initial query-execution plan exceed an associated one of the specified margins-of-error. As described in more detail below, the alternative query-execution plans are available for use by the query-execution component of the DBMS when the actual costs associated with arriving at an intermediate-result set exceed the specified margins-of-error.

As the DBMS carries out the initial query-execution, the query-execution log gathers information about the query-execution process, including information that indicates the row counts returned from database tables in executing the query (step 410). Upon reaching a specified intermediate checkpoint in the initial query-execution plan, the query-execution component of the DBMS instructs the self-adjusting optimizer to compare the actual costs of query execution to the expected costs (step 420). To do so, the self-adjusting optimizer draws upon the row-count information stored in the query-execution log and the statistical data stored in the statistics database to calculate the actual costs of executing the query to the intermediate checkpoint (step 430).

The self-adjusting optimizer then compares the actual costs incurred in executing the query plan with the expected costs that it calculated previously (step 440). In doing so, the self-adjusting optimizer first determines whether the actual costs differ from the expected costs by less than the specified margin-of-error (step 450). If so, the self-adjusting optimizer instructs the query-execution component of the DBMS to continue with the initial query-execution plan (step 460). If, on the other hand, the actual and estimated costs differ by more than the margin-of-error, then the self-adjusting optimizer program instructs the query-execution component to switch to an alternative query-execution plan (step 470). If the self-adjusting optimizer program has already created the alternative query-execution plan, it retrieves that plan and delivers it to the query-execution component (step 480). If the self-adjusting optimizer has not yet created the alternative query-execution plan, it does so at this point (step 490) and then delivers the plan to the query-execution component.

In some systems, upon reaching a second intermediate checkpoint in the query-execution process (whether continuing with the initial query-execution plan or switching to the alternative query-execution plan), the query-execution component of the DBMS again instructs the self-adjusting optimizer to compare the actual costs of query execution to the expected costs (step 510). The self-adjusting optimizer once again draws upon the row-count information stored in the query-execution log and the statistical data stored in the statistics database to calculate the actual costs of executing the query to the second intermediate checkpoint (step 520). The self-adjusting optimizer then again compares the actual costs incurred in executing the query plan with expected costs that it has calculated previously (step 530). As before, the self-adjusting optimizer determines whether the actual costs differ from the expected costs by less than the specified margin-of-error (step 540). If so, the self-adjusting optimizer instructs the query-execution component of the DBMS to continue with its current query-execution plan (step 550); if not, the self-adjusting optimizer instructs the query-execution component to switch to another alternative query-execution plan (step 560) and delivers this alternative plan to the query-execution component (step 570).

In creating an alternative query-execution plan, the self-adjusting optimizer often must decide whether the circumstances are likely to call for an alternative plan that differs only partially from the initial query-execution plan or for a plan that differs entirely from the initial plan. In doing so, the self-adjusting optimizer might conclude that the cost estimates it sees in preparing the initial query-execution plan justify the association of two or more trigger thresholds with an intermediate checkpoint embedded in the plan, where each trigger threshold, when exceeded, will lead to the selection of a corresponding one of multiple alternative query-execution plans. For example, if the difference between the actual costs and the expected costs at the intermediate checkpoint were greater than one of the trigger thresholds but smaller than another of the trigger thresholds, then the self-adjusting optimizer might instruct the DBMS to follow an alternative query-execution plan that differs only partially from the initial query-execution plan—i.e., from some selected point, such as the intermediate checkpoint, forward. If, however, the difference between actual and estimated costs at the intermediate checkpoint were so great that they exceeded more than one of the trigger thresholds, the self-adjusting optimizer might instruct the DBMS to abandon the initial query-execution plan altogether and begin anew with an alternative plan that differs entirely from the initial plan.

The size of the margin-of-error that the self-adjusting optimizer program will allow in any given situation before switching to an alternative query-execution plan will depend on the circumstances in that given situation. The self-adjusting optimizer usually tailors the size of the margin-of-error to the relative efficiencies of the initial query-execution plan and the "next best" plan that it has identified. The self-adjusting optimizer is able to assign unique margins-of-error to each query the DBMS receives and even to each execution step within each query, according to these criteria.

Figure 6:
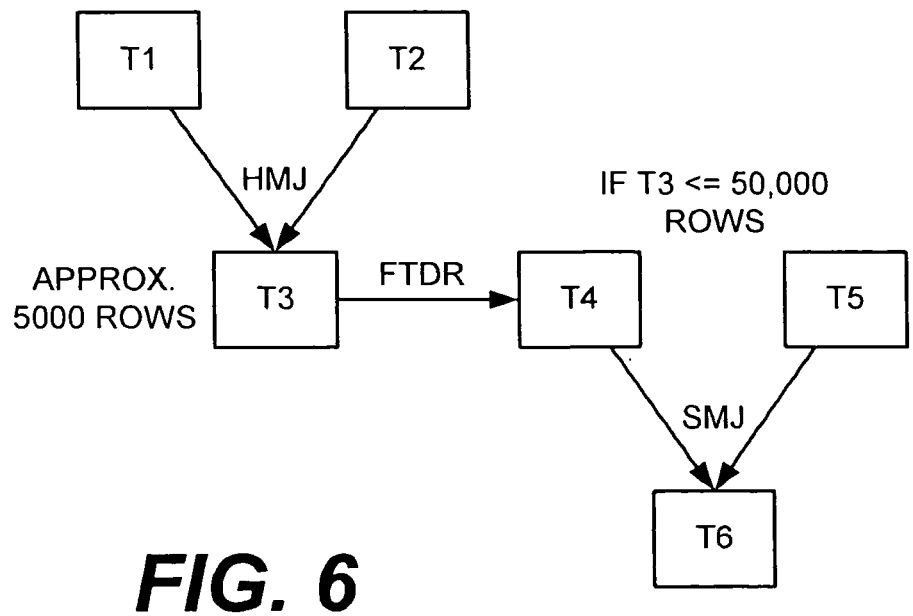
FIGS. 6 and 7 are diagrams illustrating one example of an initial query-execution plan to be followed if one set of results occurs and an alternative query-execution plan to be followed if another set of results occurs.

As an example, FIG. 6 illustrates an initial query-execution plan that, in generating a result set, calls for a hash-merge join (HMJ) of two tables, T1 and T2, to produce a third table T3. The query-execution plan then calls for a full-table duplicate & redistribution (FTDR) operation on table T3 to produce a fourth table T4, followed by a sort-merge join of this table with a fifth table T5 to produce a result set in a sixth table T6.

In generating this query-execution plan, the self-adjusting optimizer estimates the costs of query execution based on a table size of approximately 5000 rows for table T3. The self-adjusting optimizer uses this expected-cost information in formulating an initial query-execution plan, tailoring the plan for optimal efficiency when the actual size of table T3 is indeed 5000 rows. In this example, however, the self-adjusting optimizer concludes that even if the size of table T3 were to grow to as large as 50,000 rows, the original plan would still be acceptable, even if not ideal. The self-adjusting optimizer therefore associates with the initial query-execution plan a first trigger threshold that specifies a first margin-of-error of 50,000 rows and instructions to execute the plan to its conclusion as long as the actual size of table T3 does not exceed the first margin-of-error.

Figure 7:
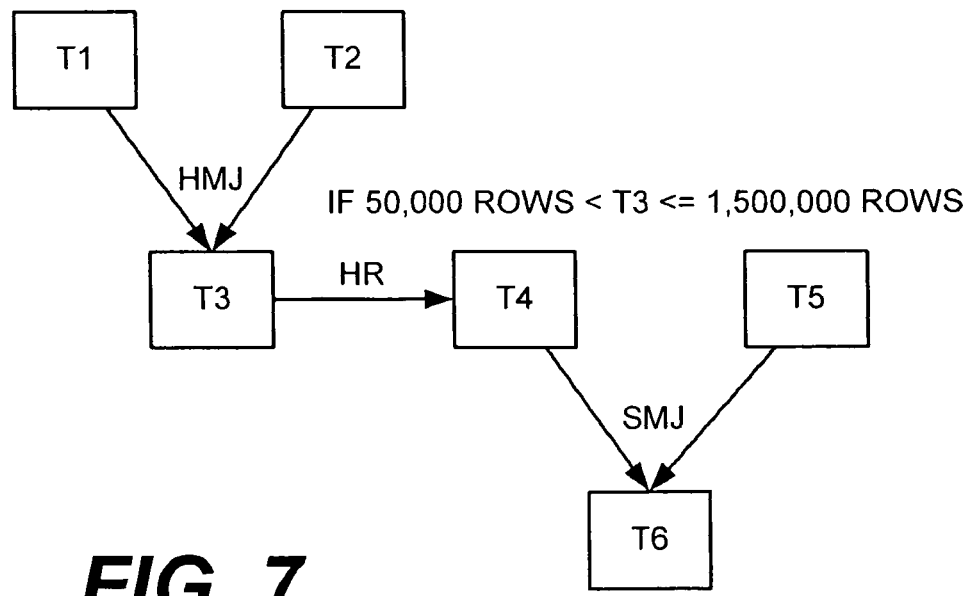

The self-adjusting optimizer also concludes, however, that if the size of table T3 were to exceed 50,000 rows, an alternative query-execution plan would become more efficient than the original plan. Under this alternative plan, which is illustrated in FIG. 7, table T3 would undergo a hash-redistribution (HR) operation, instead of the FTDR operation provided for in the initial query-execution plan, to produce the fourth table T4. This table would then undergo a sort-merge join (SMJ) operation with the fifth table T5 to produce the result set found in table T6. The self-adjusting optimizer concludes also that this alternative query-execution plan would still be optimal, though perhaps not ideal, even if the size of table T3 were to grow to as many as 1.5 million rows. The self-adjusting optimizer therefore associates with the initial query-execution plan a second trigger specifying a margin-of-error of 1.5 million rows and an instruction to replace the FTDR operation on table T3 with an HR operation if the actual size of table T3 exceeds the first margin-of-error but does not exceed the second margin-of-error.

The self-adjusting optimizer also concludes that, if the actual size of table T3 were to exceed 1.5 million rows, the DBMS would need to follow an entirely different query-execution plan altogether. As a result, the self-adjusting optimizer embeds in the original query-execution plan an instruction to abandon the initial query-execution plan and implement a new query-execution plan if the actual size of table T3 exceeds the second margin-of-error.

It is important to note that, in some systems, the self-adjusting optimizer is configured to prepare one or more alternative query-execution plans before it begins executing the query, while in other systems, it does not prepare an alternative plan until it concludes than an alternative plan is necessary. Still other systems use some combination of these two techniques—i.e., the self-adjusting optimizer prepares both an initial plan and one or more alternative plans before it begins executing the query and then later, after starting query execution and concluding that none of these plans is acceptable, prepares one or more alternative plans "on the fly."

Computer-Based and Other Implementations

The various implementations of the invention are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

Such a computer program includes executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, instead of calculating actual costs as a function of the row counts produced at intermediate checkpoints, the self-adjusting optimizer in some systems receives database-demographics information indicating how database resources are being used during execution of the query. The optimizer compares the database-demographics information that is collected during execution of the query with a model set of database-demographics information that represents the expected use of database resources. If the DBMS is using database resources significantly differently than was expected, the optimizer instructs the DBMS to switch to an alternative query-execution plan.

Also, as another example, in some embodiments comparison of actual costs to expected costs is performed outside the self-adjusting optimizer—e.g., by the query-execution component or by some other component of the DBMS. Many other embodiments are also within the scope of the following claims.

I claim:

1. A computer-implemented method for use in executing a query in a database system, the method comprising:
    formulating an initial query-execution plan that identifies an expected path for execution of the query;
    formulating, prior to an execution of said query according to said initial query-execution plan, an alternative query-execution plan for execution of the query, said alternative query-execution plan differing from the initial query-execution plan from a point that occurs after an intermediate checkpoint in the initial query-execution plan;
    initiating the execution of the query according to said initial query-execution plan;
    at said intermediate checkpoint in the initial query-execution plan:
        concluding that an actual result obtained at the intermediate checkpoint in the initial query-execution plan does not match an expected result; and
        in response, choosing said alternative query-execution plan for the execution of the query;
    continuing the execution of the query according to said alternative query-execution plan from said point that occurs after said intermediate checkpoint; and
    abandoning the execution of the query according to said initial query-execution plan from said point that occurs after said intermediate checkpoint.

2. The method of claim 1, wherein concluding that the actual result does not match the expected result includes concluding that the actual result differs from the expected result by more than an amount equal to a predefined margin-of-error.

3. The method of claim 1, wherein concluding that the actual result does not match the expected result includes concluding that the actual result differs from the expected result by more than an amount equal to one of at least two predefined margins-of-error.

4. The method of claim 3, wherein choosing said alternative query-execution plan includes choosing one of at least two alternative query-execution plans, where each of the at least two alternative query-execution plans corresponds to one of the at least two predefined margins-of-error.

5. The method of claim 1, wherein concluding that an actual result does not match an expected result includes concluding that an actual row count for a database table does not match an expected row count.

6. The method of claim 1, further comprising:
    concluding that an actual result obtained at a second intermediate checkpoint does not match an expected result for the second intermediate checkpoint; and
    choosing another alternative query-execution plan for the execution of the query following a point after said second intermediate checkpoint.

7. A computer-implemented method for use in executing a query in a database system, the method comprising:
    formulating an initial query-execution plan that identifies an expected path for execution of the query;
    formulating, prior to an execution of said query according to said initial query-execution plan, an alternative query-execution plan for execution of the query;
    initiating the execution of the query according to said initial query-execution plan;
    and at some point after the execution of the query has begun:
        concluding that an actual result obtained at a first intermediate checkpoint in the initial query-execution plan matches an expected result for the first intermediate checkpoint;
        concluding that an actual result for a second intermediate checkpoint in the initial query-execution plan does not match an expected result for the second intermediate checkpoint; and
        in response, choosing said alternative query-execution plan for the execution of the query;
    continuing the execution of the query according to said alternative query-execution plan from a point that occurs after said second intermediate checkpoint; and
    abandoning the execution of the query according to said initial query-execution plan from said point that occurs after said second intermediate checkpoint.

8. A tangible, non-transitory computer readable storage medium, having a computer program for use in executing a query in a database system, the program comprising computer-readable instructions that, when executed by a computer, cause the computer to:
    formulate an initial query-execution plan that identifies an expected path for execution of the query;
    formulate, prior to an execution of said query according to said initial query-execution plan, an alternative query-execution plan for execution of the query, said alternative-execution plan differing from the initial query-execution plan from a point that occurs after an intermediate checkpoint in the initial query-execution plan;
    initiate the execution of the query according to said initial query-execution plan;
    at said intermediate checkpoint in the initial query-execution plan:
        conclude that an actual result obtained at the intermediate checkpoint in the initial query-execution plan does not match an expected result; and in response, choose said alternative query-execution plan for the execution of the query;

continue the execution of the query according to said alternative query-execution plan from said point that occurs after said intermediate checkpoint; and abandon the execution of the query according to said initial query-execution plan from said point that occurs after said intermediate checkpoint.

9. The tangible, non-transitory computer readable storage medium, having a computer program for use in executing a query in a database system in accordance with claim 8, wherein, in concluding that the actual result does not match the expected result, the computer concludes that the actual result differs from the expected result by more than an amount equal to a predefined margin-of-error.

10. The tangible, non-transitory computer readable storage medium, having a computer program for use in executing a query in a database system in accordance with claim 8, wherein, in concluding that the actual result does not match the expected result, the computer concludes that the actual result differs from the expected result by more than an amount equal to one of at least two predefined margins-of-error.

11. The tangible, non-transitory computer readable storage medium, having a computer program for use in executing a query in a database system in accordance with claim 10, wherein, in choosing said alternative query-execution plan, the computer chooses one of at least two alternative query-execution plans, where each of the at least two alternative query-execution plans corresponds to one of the at least two predefined margins-of-error.

12. The tangible, non-transitory computer readable storage medium, having a computer program for use in executing a query in a database system in accordance with of claim 8, wherein, in concluding that an actual result does not match an expected result, the computer concludes that an actual row count for a database table does not match an expected row count.

13. The tangible, non-transitory computer readable storage medium, having a computer program for use in executing a query in a database system in accordance with claim 8, wherein the program also causes the computer to:

conclude that an actual result obtained at a second intermediate checkpoint does not match an expected result for the second intermediate checkpoint; and choose another alternative query-execution plan for the execution of the query following a point after said second intermediate checkpoint.

14. A tangible, non-transitory computer readable storage medium, having a computer program for use in executing a query in a database system, the computer program including computer-readable instructions that, when executed by a computer, cause the computer to:

formulate an initial query-execution plan for execution of the query that includes an initial cost estimate indicating how one or more database resources are expected to be used in carrying out the initial query-execution plan;

formulate, prior to an execution of said query according to said initial query-execution plan, an alternative query-execution plan for execution of the query, said alternative-execution plan differing from the initial query-execution plan from a point that occurs after an intermediate checkpoint in the initial query-execution plan;

start the execution of the query according to the initial query-execution plan; and at said intermediate checkpoint after the execution of the query according to the initial query-execution plan has started:

receive information about an actual result obtained during the execution of the query according to the initial query-execution plan;

use the actual result to calculate a revised cost estimate indicating how the one or more database resources are expected to be used in carrying out the initial query-execution plan from the intermediate checkpoint;

compare the revised cost estimate to the initial cost estimate;

conclude that the revised cost estimate lies beyond a predetermined margin-of-error around the initial cost estimate;

continue the execution of the query according to said alternative query-execution plan from said point that occurs after said intermediate checkpoint; and abandon the execution of the query according to said initial query-execution plan from said point that occurs after said intermediate checkpoint.

* * * * *